Sept. 5, 1950 C. M. ZAJDEL 2,521,274
REVOLVING TURRET ADAPTER
Filed June 30, 1945 2 Sheets-Sheet 1

INVENTOR.
Casimir M. Zajdel.
BY Victor J. Evans & Co.
ATTORNEYS

Sept. 5, 1950  C. M. ZAJDEL  2,521,274
REVOLVING TURRET ADAPTER
Filed June 30, 1945  2 Sheets-Sheet 2

INVENTOR.
Casimir M. Zajdel.
BY Victor J. Evans & Co.
ATTORNEYS

Patented Sept. 5, 1950

2,521,274

UNITED STATES PATENT OFFICE 2,521,274

REVOLVING TURRET ADAPTER

Casimir M. Zajdel, Chicago, Ill.

Application June 30, 1945, Serial No. 602,442

1 Claim. (Cl. 29—57)

My present invention, in its broad aspect, has to do with improvements in revolving adapters for turret lathes, and it is my purpose to provide three additional holes in the face of the turret for extra tools, thereby speeding up machining time, speeding the set-up of the lathe, and saving extra operations. Furthermore, my adapter assures perfect alignment with the center by reason of the use of floating tool holders and a novel indexing device, and allows for a certain amount of adjustment of the tool. My adapter has a support for attachment by bolts, or otherwise, with the face of the turret lathe. A turret lathe ordinarily has six holes for tools, and my revolving adapter provides three extra holes for tools, any one of which may be perfectly aligned with the lathe center and indexed to maintain such alignment by an improved indexing device including a spring pressed indexing pin and eccentric operating shaft. I provide an improved guard for preventing chips and dirt from entering the index holes. My revolving adapter is simple in construction and operation, and accurate, and is a time saver in the operation of turret lathes.

Other and equally important objects and advantages of my invention will be apparent from the following description and drawings, and it is pointed out that changes in form, size, shape, materials and construction and arrangement of parts are permissible and within the purview of my broad inventive concept, and the scope of the appended claim.

In the drawings, wherein I have illustrated a preferred form of my invention:

In the drawings wherein like characters of reference are used to designate like or similar parts throughout the several views.

Figure 1:
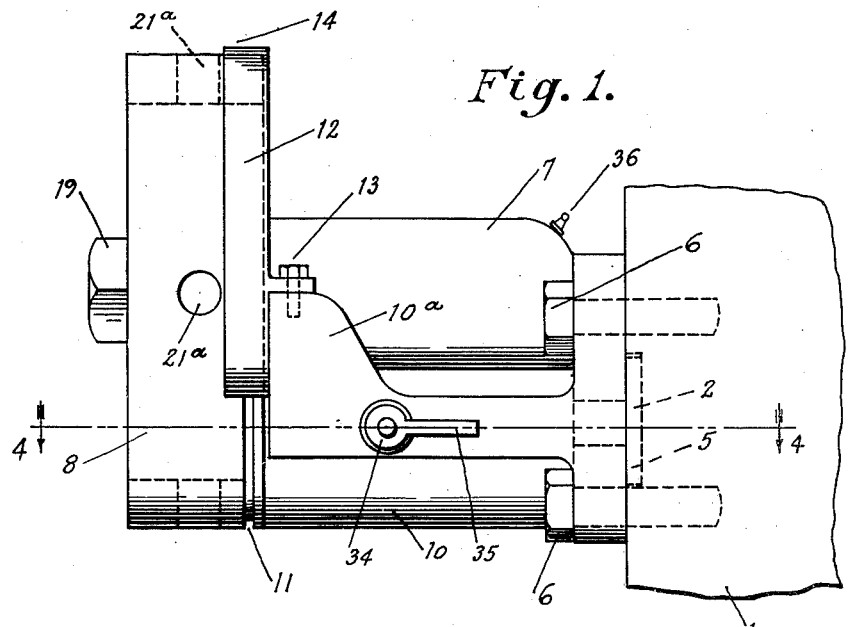
Figure 1 is a side elevation.

The numeral 1 designates a fragment of the face of a turret lathe, the center of which is designated 2. My support 3 for my revolving adapter has a base plate 4 with a circular boss 5 registering and aligning with the center 2 and bolts 6 by which the base plate is attached to the face of the turret lathe 1. Centered adjacent the top of the base and integral therewith is a cylindrical forward extension 7 on which my revolving adapter 8 is rotatably mounted; there being provided a threaded attaching bolt 9 for that purpose on the extension. Below the cylindrical forward extension 7 and concentric therewith is an arcuate skirt 10 which is curved upwardly on each side at the forward edge as at 10a. The skirt 10, like the extension 7, is integral with the base 4.

Figure 2:
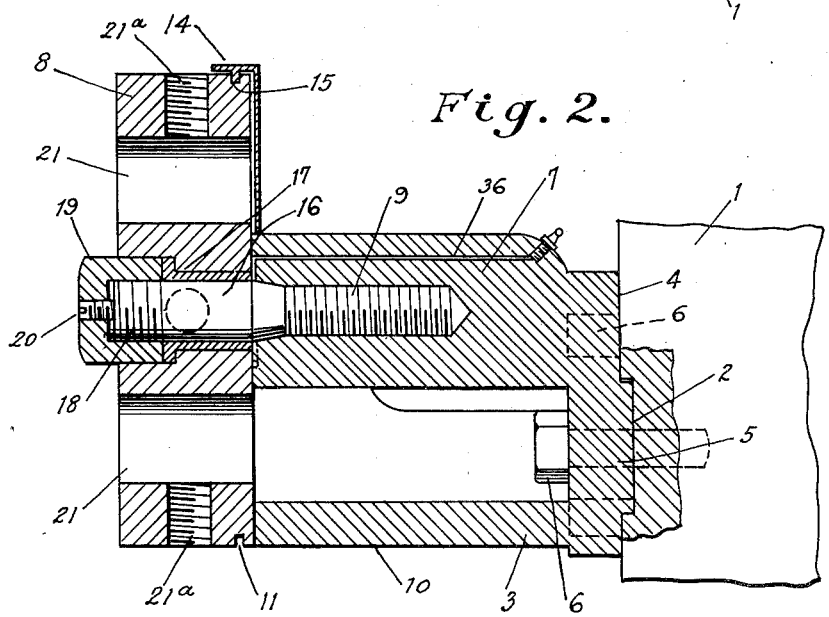
Figure 2 is a longitudinal section.
Figure 3:
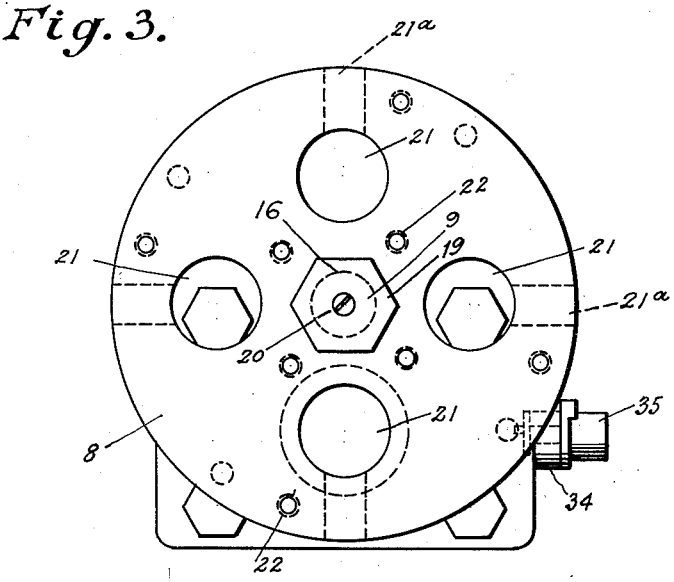
Figure 3 is a face view of my adapter.
Figure 4:
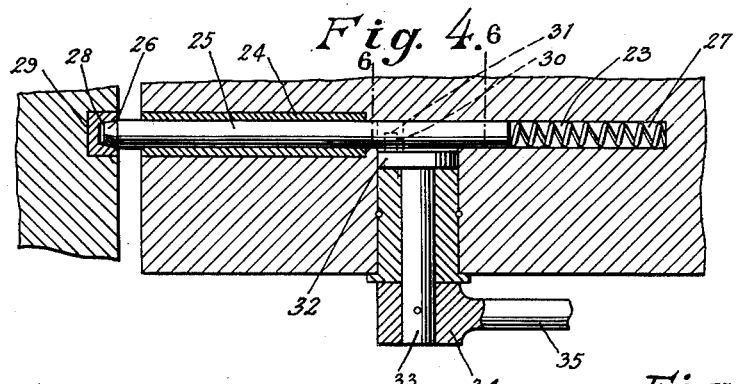
Figure 4 is a section on the line 4—4 of Figure 1.
Figure 5:
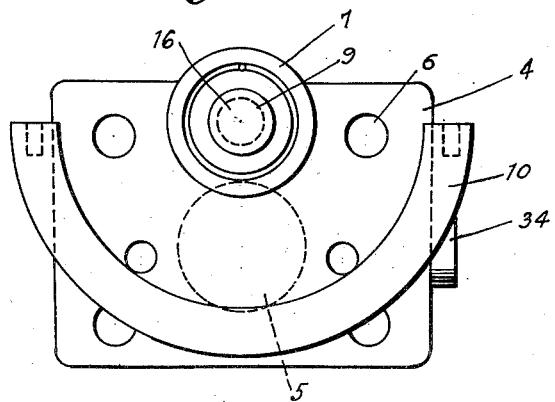
Figure 5 is a face view of the support for the revolving adapter.
Figure 6:
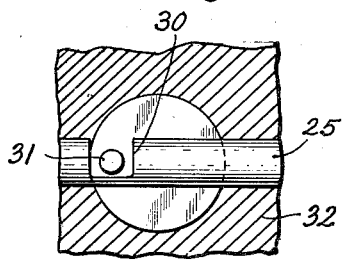
Figure 6 is a sectional view taken on the line 6—6 of Figure 4.

My revolving adapter 8 is circular and adjacent its rear edge has an annular groove 11 for the semi-circular guard plate 12 which is bolted to the curved part of the skirt at 13 and has a forwardly extending guard flange 14 for preventing entrance of chips and dirt and which has an interior bead 15 fitting in the groove 11 for retaining the same in place. The revolving adapter rides against the arcuate face of the skirt 10 which face because of its arcuate shape is brought up at its respective sides to substantial alignment with the axis of rotation of the adapter to provide a full flat bearing support. The bolt 9 on which the adapter rotates has a cylindrical part 16 on which the adapter rotates and a bushing 17 and is threaded as at 18 to receive a cap nut 19 having a locking set screw 20 to hold the same properly adjusted. Four diametrically opposed circular openings 21 are provided in the adapter and these are so aligned circumferentially as to register selectively with the center 2 of the lathe turret. In addition, there are tapped holes 22 for use of center drill taps, reamers, hollow mills and the like. Accordingly, it will be seen that three more openings are provided by my adapter than are provided by the conventional turret lathe, and as shown in Figure 2, tools mounted in the openings 21 are capable of considerable adjustment especially as to length. The peripheral edge of the revolving adapter is provided with threaded bores 21a communicating with the openings to lock tools in the openings 21. Mounted in a bore 23 in the skirt 10 and having an enlarged part to receive a bushing 24, is an index pin 25 which has a tapered head 26 and is pressed by a spring 27 which normally presses the pin into tapered aligning openings 28 in the revolving adapter which has a bushing 29. The index pin 25 has a transverse slot 30 for receiving a pin 31 on a head 32 which is carried as by a shaft 33, the shaft 33 being attached to a hub 34 which has an operating handle 35 to oscillate the pin 31 which moves the index pin 25 back and forth. A lubricating channel 36 is provided for the revolving adapter. In Fig. 4 the pin 31 is shown at a position within and adjacent one side of the slot 30, said side being that toward the head of the pin, whereupon, upon movement or rotation of the shaft 33, the pin 31 is given sufficient throw to retract the index pin 25.

From the foregoing, it is believed that the operation and advantages of my invention will be apparent, but it is again emphasized that interpretation of the scope of my invention should only be conclusive when made in the light of the subjoined claim.

I claim:

A rotatable tool holding adapter for a turret lathe, said adapter comprising in combination a rear portion for attachment to the lathe turret, an upper cylindrical forward extension extending from said rear portion, a lower arcuate shaped skirt portion extending forwardly from said rear portion, a rotatable tool holder mounted on the end of the cylindrical extension, a bolt passing through an opening in the center of said holder and extending into the cylindrical extension to form a support for the holder, a bushing in said holder and engaging said supporting bolt, a locking nut mounted on the outer end of the bolt, the front face of the arcuate skirt portion providing a supporting surface for the rotatable holder, a groove in the periphery of said holder, and a semi-circular guard plate having a flange fitting the groove of the holder and being mounted on the upper sides of the arcuate skirt portion, and a spring pressed indexing pin mounted within the arcuate skirt portion and extending when in projected position from the face of the arcuate skirt portion, operating means comprising a pin and slot connection for reciprocating said indexing pin, said holder having a plurality of tool holding openings and recesses in its rear face for receiving the indexing pin.

CASIMIR M. ZAJDEL.

REFERENCES CITED

The following references are of record in the file of this patent:

UNITED STATES PATENTS

| Number | Name | Date |
|---|---|---|
| 318,261 | Kelley | May 19, 1885 |
| 1,227,486 | Newman et al. | May 22, 1917 |
| 2,154,496 | Darash | Apr. 18, 1939 |
| 2,154,514 | Lange | Apr. 18, 1939 |
| 2,311,211 | Class | Feb. 16, 1943 |

FOREIGN PATENTS

| Number | Country | Date |
|---|---|---|
| 28,499 | Great Britain | 1897 |
| 185,728 | Switzerland | Apr. 1, 1937 |